(No Model.)
L. T. SNOW.
FOOD CHOPPER.
No. 591,575. Patented Oct. 12, 1897.
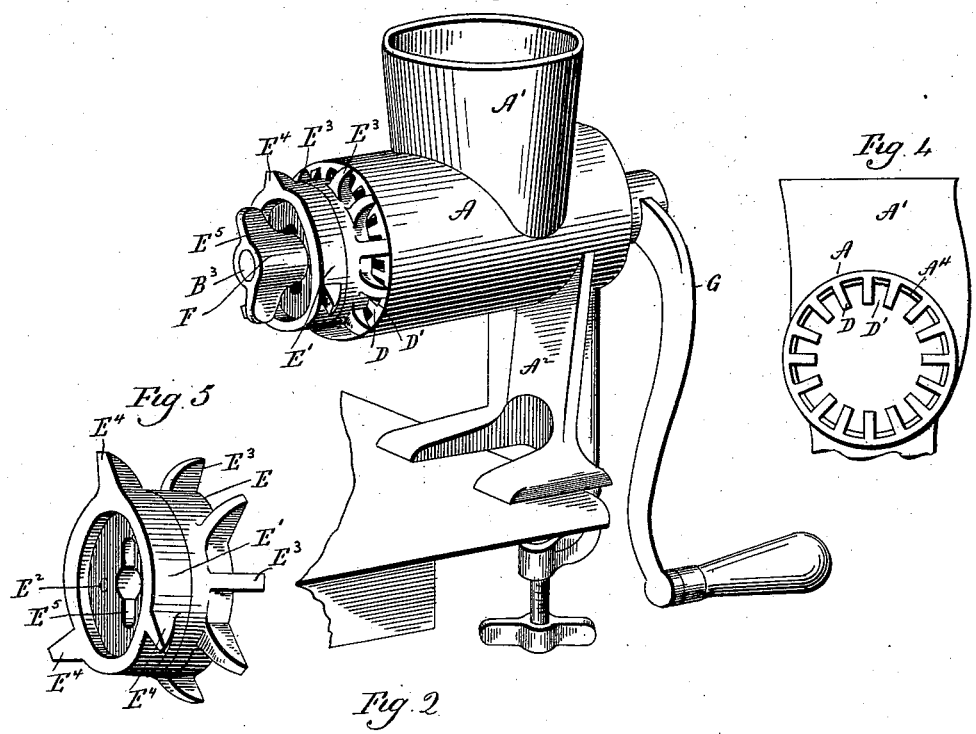
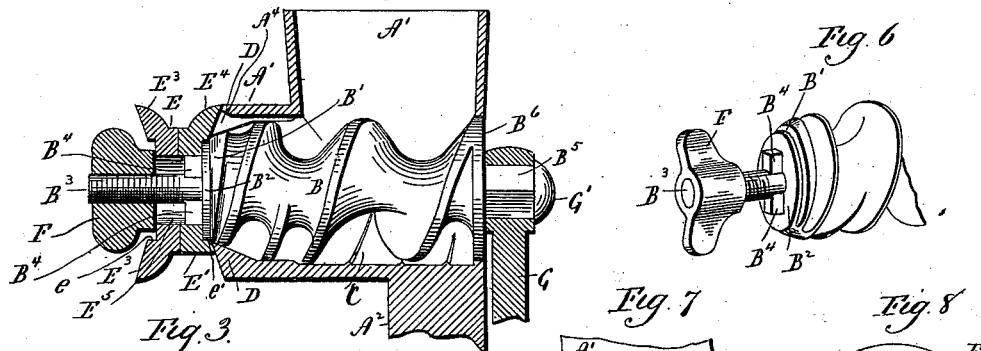
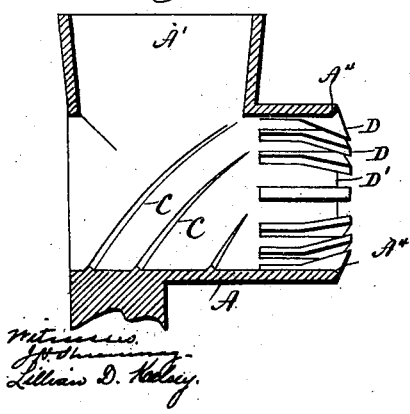
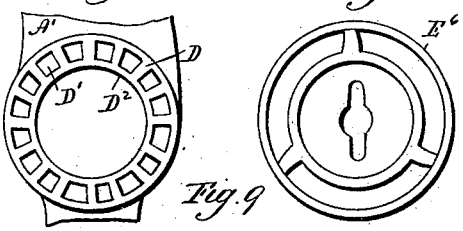

UNITED STATES PATENT OFFICE.

LEVI T. SNOW, OF NEW HAVEN, CONNECTICUT.

FOOD-CHOPPER.

SPECIFICATION forming part of Letters Patent No. 591,575, dated October 12, 1897.

Application filed February 1, 1897. Serial No. 621,424. (No model.)

*To all whom it may concern:*

Be it known that I, LEVI T. SNOW, of New Haven, in the county of New Haven and State of Connecticut, have invented a new Improvement in Food-Choppers; and I do hereby declare the following, when taken in connection with the accompanying drawings and the letters of reference marked thereon, to be a full, clear, and exact description of the same, and which said drawings constitute part of this specification, and represent, in—

Figure 1, a perspective view of a food-chopper constructed in accordance with my invention and shown as applied to the edge of a table; Fig. 2, a view of the chopper in vertical longitudinal section with the lower ends of the standard and handle broken away; Fig. 3, a broken view in vertical longitudinal section of the case as it appears when stripped of all appurtenances; Fig. 4, a view in front elevation of the case of the chopper, drawn with particular reference to showing the wedge-shaped delivery-passages formed between the projecting outer ends of its cutting-ribs; Fig. 5, a detached perspective view of the double reversible cutter; Fig. 6, a broken perspective view of the outer end of the forcer with the cutter removed, but with the thumb-nut in place; Fig. 7, a broken view in front elevation of one of the modified forms which the case may assume; Fig. 8, a view of one of the modified forms which the cutter may assume, showing the ends of the cutting-teeth united by a reinforcing-band; Fig. 9, a view of such a single cutter as may be employed in conjunction with the chopper.

My invention relates to an improvement in food-choppers, and here I may remark that I have chosen to call my improved device a "food-chopper" rather than a "meat-cutter," inasmuch as I have constructed it with particular reference to comminuting or cutting up not only meats, but also vegetables and other foods which it has been customary to prepare by cutting up in a bowl with a chopping-knife or to break up by a rolling-pin. I also wish to point out that while meat-cutters are particularly designed for the comminution of plastic substances my device is adapted to chop not only plastic substances, but also comparatively friable substances, and all without mashing or pulping them.

The object of my invention is to produce an extremely simple device composed of few parts, adapted to be readily taken apart for cleaning, and as readily reassembled, and constructed with particular reference to cutting up all kinds of foods without mashing or pulping the same.

With these ends in view my invention consists in a food-chopper having certain details of construction and combinations of parts, as will be hereinafter described, and pointed out in the claims.

In carrying out my invention as herein shown I employ a short cylindrical case or receiver A, provided with an integral upwardly-extending hopper A' and with an integral depending foot, standard, or stem A², which carries a clamping-screw A³ of ordinary construction. What I particularly wish to emphasize in this case is the comparative shortness of the cylindrical case A, which I make short, so as to reduce to the minimum the travel and time of confinement of the food to be chopped, as I desire to pass the food as quickly as possible and with the least possible forcing or jamming through the device, so as to avoid mashing or pulping it. With the same end in view the throat of the hopper or the point where the hopper intersects the case is made very large, so as to allow the food, without crowding, to come very freely under the action of the screw-like forcer B, a comparatively large portion of which is exposed directly under the hopper.

The case is provided upon its inner face with a series of spirally-arranged ribs C and with a circular series of longitudinally-arranged ribs D. The ribs C, I have chosen for convenience to call "forcing-ribs," as their main function is that of coacting with the forcer B to force the material forward through the case. On the other hand I have chosen to call the ribs D "cutting-ribs," as their main function is to coact with the cutter, to be hereinafter described, in cutting up or chopping the food as it is forced out of the case A. The said forcing-ribs C are located within the body of the case, while the said cutting-ribs are located beyond or forward of the cutting-ribs and within the outer end of the case, beyond which, indeed, their outer ends project, as clearly shown in Fig. 3. The said cutting-ribs grow gradually "wider," so to speak, from their inner to their outer ends. I may explain that in referring to the width of the cutting-ribs I mean their inward extension toward the center of the case. The inner and outer faces of the projecting outer ends of the said cutting-ribs are rearwardly beveled, their outer faces being beveled on the sharpest pitch. The projecting outer ends of the cutting-ribs together form a circular series of wedge-shaped discharge openings or passages D'. (Clearly shown in Fig. 4.) As these openings are wider at their outer than at their inner ends their form promotes the free feeding of the food to be chopped, whatever its character may be, through the device, and hence helps to prevent it from being mashed or pulped. The beveled inner faces of the projecting ends of the said ribs form a bearing for the outer end of the screw-like forcer B, which is provided at the forward end with a bevel B', conforming in pitch to the pitch of the bevel of the inner faces of the projecting ends of the cutting-ribs. The said screw-like forcer, as shown, has a deep widely-pitched or coarse thread at its inner end, which gradually increases in width and depth to its outer end; but the particular form of the screw-like forcer may be varied as required, it being only necessary that it shall be adapted to force the material forward through the discharge-openings before mentioned. I also wish to call attention to the fact that the outer edge of the case A is formed with a clearance-bevel $A^4$, as shown in Fig. 3, whereby the discharge-openings are virtually enlarged, so as to give additional relief to the food as it emerges from the case, whereby also its mashing or pulping is minimized.

As shown in Figs. 1, 2, and 5, the cutter is made double and reversible end for end, one end having more cutting-teeth than the other. Here it may be said that the more cutting-teeth the finer the chopping. As shown in the said figures, the cutter is composed of two cutting-disks E and E', rigidly secured together by means of rivets $E^2$, only one of which is shown, and that in Fig. 5. The disks might be made integral with each other, but I have found it more convenient to make them independently and secure them together. The disk E is provided with ten cutting-teeth $E^3$, while the disk E' is furnished with three cutting-teeth $E^4$, but the number of cutting-teeth may of course be varied, as desired, and will be determined by the character of the food to be cut or the range of comminution which it is desired to have the machine embrace. The inner faces of the teeth $E^3$ and $E^4$ are beveled to conform to the bevel of the outer faces of the projecting outer ends of the cutting-ribs D, with which the teeth coact to chop up the food. Here I wish to emphasize the fact that although there is some considerable preliminary cutting, or rather stripping, within the case my improved chopper is designed particularly to effect the main cutting not only at a point outside of the case, but preferably at a point beyond the outer end thereof and at a point within the point where the forcer stops forcing the material being chopped. Under this construction the material to be chopped is supplied, as it were, directly from the forcer to the cutting-teeth, whereas in prior devices of this type the material has not been supplied directly from the forcer to the cutting-teeth, but has been pressed forward from the forcer to the cutting-teeth by a portion of the material interposed, as it were, between the forcer and the cutting-teeth. Under my construction, therefore, I am enabled to force the material through the case and present it to the action of the cutting-knives without the imposition upon it of as much pressure as the prior devices have required, making my device easier to operate, and avoiding the mashing and pulping effect of too much pressure upon the material being treated.

The cutter may be coupled with the outer end of the forcer in any convenient manner. As herein shown, the end of the forcer is formed with a circular shoulder $B^2$, which enters a shallow centrally-arranged recess $e$, formed for its reception in the disk E, as shown in Fig. 2, and also, when the cutter is reversed, a shallow centrally-arranged circular recess $e'$, formed for its reception in the cutter-disk E'. The said shoulder when entered into either one of the said recesses centers the cutter with respect to the forcer and preserves the right relation of the cutter-teeth to the projecting ends of the ribs. The said shoulder $B^2$ also coacts with the cutter to give outward direction to the crude food material as it issues from the case and prevents it from being forced inward between the inner portion of the cutter and the outer end of the forcer.

The outer end of the forcer is furnished with an axially-arranged screw $B^3$ and with two coupling-lugs $B^4 B^4$, located opposite each other at the inner end of the screw. For the reception of the said screws and lugs the disks E and E' of the cutter are each formed with a slot $E^5$, centrally enlarged to receive the screw and adapted at its ends to receive the said lugs. After the forcer has been inserted into the case the cutter is slipped over the end of the screw, after which a thumb-nut F is applied to the end of the screw and screwed down upon the outer face of the outermost cutter-disk. To take the device apart, it is only necessary to remove the said thumb-nut, after which the cutter may be slipped off the screw and the forcer pulled out of the case. The rear end of the forcer is formed with a bearing-disk $B^6$, which bears in a circular opening $A^5$, formed in the rear end of the case A. The rear end of the forcer is also formed with a projecting hub $B^5$, which provides for the attachment of the handle G, which is secured to the hub by a screw G', but the construction of the handle and the mode of securing it to the forcer may be varied, as desired, as it constitutes no part of my present invention.

It will be seen from the foregoing description that my improved device is composed of few parts, all of which are very simple in form, and that it may be easily taken apart and put together and operated by any one of ordinary understanding and without the exercise of any special skill; but I wish to specially emphasize the fact that the device is constructed so that meat, vegetable, or other foods may be chopped up or comminuted with the imposition upon them of the minimum of pressure, and therefore without the mashing or pulping, which makes the ordinary meat-cutters so objectionable in use. Thus juicy fruits, like apples, may be cut up in small, clean-cut, or well-defined pieces and without having their juice expressed to any extent.

It is apparent that in carrying out my invention some modifications of the construction shown and described may be made. Thus I may, if desired, reinforce the device by connecting the projecting outer ends of all of the cutting-ribs together by means of an annular reinforcing-band $D^2$, as shown in Fig. 8. This band does not materially modify the action of the device, but does strengthen it. In Fig. 8 I have shown the strengthening of the cutter by uniting the outer ends of its teeth by means of a strengthening-band $E^6$, which may be employed or not, as desired. I prefer, as I have stated, to employ reversible cutters having an unequal number of teeth, but it is plain that instead of employing double cutters I may employ a plurality of single cutters having a different number of teeth. Such a single cutter $E^7$, having a comparatively large number of teeth, is shown by Fig. 9 and will serve as an illustration of a single cutter.

I would therefore have it understood that I do not wish to be understood as limiting my invention to the exact construction herein shown and described, but hold myself at liberty to make such changes and alterations as fairly fall within the spirit and scope of my invention.

Having fully described my invention, what I claim as new, and desire to secure by Letters Patent, is—

1. In a food-chopper, the combination with a case provided with a circular series of cutting-ribs, the outer ends of which project beyond its outer end, and the spaces between which form discharge-openings, of a rotatable forcer located within the case, and a cutter connected with the forcer for rotation therewith and located entirely without the said case, and provided with teeth which are extended rearward back of the outer end of the forcer and which coact with the projecting outer ends of the said ribs to cut the material to be chopped at a point within the point where the outer end of the forcer ceases to exert feeding-pressure upon the material.

2. In a food-chopper, the combination with a case having a screw-like forcer located within it, and a double or reversible cutter having radially-arranged teeth applied to the outer end of the forcer, located entirely without the case and having more teeth at one end than at the other.

3. In a food-chopper, the combination with a case provided with a circular series of cutting-ribs, the outer ends of which project beyond its outer end, and have their outer faces rearwardly beveled, and form a circular series of wedge-shaped discharge-openings, the outer ends of which are larger than their inner ends; of a forcer located within the said case, and a cutter removably applied to the outer end of the forcer, located entirely without the case and furnished with cutting-teeth having their inner faces beveled to conform to the bevel of the outer faces of the projecting ends of the ribs.

4. In a food-chopper, the combination with a case provided with a circular series of cutting-ribs, the outer ends of which project beyond its outer end, and the spaces between which form discharge-openings, and having its outer end formed with a clearance-bevel which virtually enlarges the said openings; of a forcer located within the said case, and a cutter applied to the outer end of the forcer and furnished with teeth conforming to and coacting with the outer faces of the projecting outer ends of the said ribs for chopping the food.

5. In a food-chopper, the combination with a case provided with a circular series of cutting-ribs, the outer ends of which project beyond its outer end and having their inner faces beveled, of a forcer located within the case and bearing at its outer end upon the said beveled faces of the said ribs, and a cutter applied to the outer end of the forcer, and furnished with cutting-teeth extending rearward back of the outer end of the forcer and coacting with the projecting outer ends of the said ribs.

6. A double or reversible cutter, said cutter being composed of two independently-formed disks furnished with radially-arranged cutting-teeth, rigidly secured together, and adapted to be removably coupled to the outer end of the forcer of a food-chopper, the said disks being differentiated as to the number of their cutting-teeth, so that the cutter may be used for chopping coarse and fine.

7. In a food-chopper, the combination with a case provided with a circular series of cutting-ribs, the outer ends of which project beyond its outer end, and having their inner faces beveled, of a screw-like forcer located within the case, having its forward end furnished with a bevel bearing upon the said beveled inner faces of the ribs, and also having its forward end formed with a circular shoulder; and a cutter connected with the outer end of the forcer, located entirely without the case, coacting with the outer faces of the projecting outer ends of the said ribs, and having a recess for the reception of the said circular shoulder of the forcer.

In testimony whereof I have signed this specification in the presence of two subscribing witnesses.

LEVI T. SNOW.

Witnesses:
FRED. C. EARLE,
LILLIAN D. KELSEY.